(12) United States Patent
Luharuka et al.

(10) Patent No.: US 10,213,755 B2
(45) Date of Patent: Feb. 26, 2019

(54) WELLSITE MIXER SENSING ASSEMBLY AND METHOD OF USING SAME

(71) Applicant: SCHLUMBERGER TECHNOLOGY CORPORATION, Sugar Land, TX (US)

(72) Inventors: Rajesh Luharuka, Katy, TX (US); Kim Hodgson, Sugar Land, TX (US); Rod William Shampine, Houston, TX (US); Avinash Ramesh, Houston, TX (US); Larry Dale Welch, Missouri City, TX (US); Mieszko Salamon, Littleton, CO (US); Jijo Joseph, Houston, TX (US); Gocha Chochua, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 723 days.

(21) Appl. No.: 14/460,944

(22) Filed: Aug. 15, 2014

(65) Prior Publication Data

US 2016/0047184 A1 Feb. 18, 2016

(51) Int. Cl.
*B01F 15/00* (2006.01)
*E21B 21/06* (2006.01)
(Continued)

(52) U.S. Cl.
CPC ........ *B01F 15/00201* (2013.01); *B01F 7/167* (2013.01); *B01F 15/00246* (2013.01);
(Continued)

(58) Field of Classification Search
CPC .................................................. B01F 15/00201
(Continued)

(56) References Cited

U.S. PATENT DOCUMENTS

| 2,266,733 A | 12/1941 | Bays et al. |
| 2,513,562 A * | 7/1950 | Holuba ............... B01F 15/0408 137/263 |

(Continued)

FOREIGN PATENT DOCUMENTS

WO 2013009715 A1 1/2013

OTHER PUBLICATIONS

Oldshue, "Fluid Mixing Technology", Mcgraw-Hill, Dec. 1983, pp. 58-71.

*Primary Examiner* — David L Sorkin
(74) *Attorney, Agent, or Firm* — Michael L. Flynn; Rachel E. Greene; Robin Nava

(57) ABSTRACT

A mixer sensing assembly of a mixer for mixing a wellsite fluid in a tank at a wellsite is provided. The mixer includes a shaft driven by a driver and a paddle operatively connectable to the shaft and rotatable therewith. The sensor assembly includes a mount operatively connectable to the shaft, a fluid interface, and a mixing sensor. The fluid interface is responsive to flow of the wellsite fluid passing thereby, and is connectable to the mount. The mixing sensor is connectable to the mount, the fluid interface, and/or the shaft to measure a strain applied to the thereto whereby fluid parameters of the wellsite fluid may be determined. The wellsite fluid may be mixed moving the components in the tank with the mixer, and measuring a strain on the mixer by detecting movement of the sensor assembly.

6 Claims, 13 Drawing Sheets

(51) Int. Cl.
*B01F 7/16* (2006.01)
*B01F 15/04* (2006.01)
*G01L 1/00* (2006.01)

(52) U.S. Cl.
CPC ........ *B01F 15/0408* (2013.01); *E21B 21/062* (2013.01); *G01L 1/00* (2013.01)

(58) Field of Classification Search
USPC .................................. 366/142, 151.1, 152.2
See application file for complete search history.

(56) References Cited

U.S. PATENT DOCUMENTS

| | | | |
|---|---|---|---|
| 2,904,401 A | 9/1959 | Booth | |
| 3,161,203 A | 12/1964 | Hathorn et al. | |
| 4,582,638 A * | 4/1986 | Homer | G21F 9/008 250/506.1 |
| 4,704,035 A * | 11/1987 | Kowalczyk | B01F 15/00207 366/142 |
| 4,747,690 A * | 5/1988 | Hayashi | A21C 1/146 366/141 |
| 5,030,011 A | 7/1991 | Kronberg | |
| 5,046,856 A | 9/1991 | McIntire | |
| 5,452,954 A | 9/1995 | Handke et al. | |
| 5,906,432 A * | 5/1999 | Wade | A21C 1/02 366/100 |
| 6,306,800 B1 | 10/2001 | Samuel et al. | |
| 7,048,432 B2 | 5/2006 | Phillippi et al. | |
| 7,353,874 B2 | 4/2008 | Dykstra et al. | |
| 7,404,832 B2 | 7/2008 | Ohtsubo et al. | |
| 8,127,844 B2 | 3/2012 | Luharuka et al. | |
| 8,366,408 B2 | 2/2013 | Wago et al. | |
| 8,641,266 B2 | 2/2014 | McIntire | |
| 2005/0201197 A1 | 9/2005 | Duell et al. | |
| 2008/0066911 A1 | 3/2008 | Luharuka et al. | |
| 2008/0264641 A1 | 10/2008 | Slabaugh et al. | |
| 2010/0202245 A1 | 8/2010 | Brannon et al. | |
| 2010/0243251 A1 | 9/2010 | Luharuka et al. | |
| 2012/0018150 A1 | 1/2012 | Shampine et al. | |
| 2013/0255953 A1 | 10/2013 | Tudor | |
| 2013/0309052 A1 | 11/2013 | Luharuka et al. | |
| 2013/0319220 A1 | 12/2013 | Luharuka et al. | |
| 2014/0044508 A1 | 2/2014 | Luharuka et al. | |
| 2014/0121973 A1 | 5/2014 | Buchanan et al. | |

\* cited by examiner

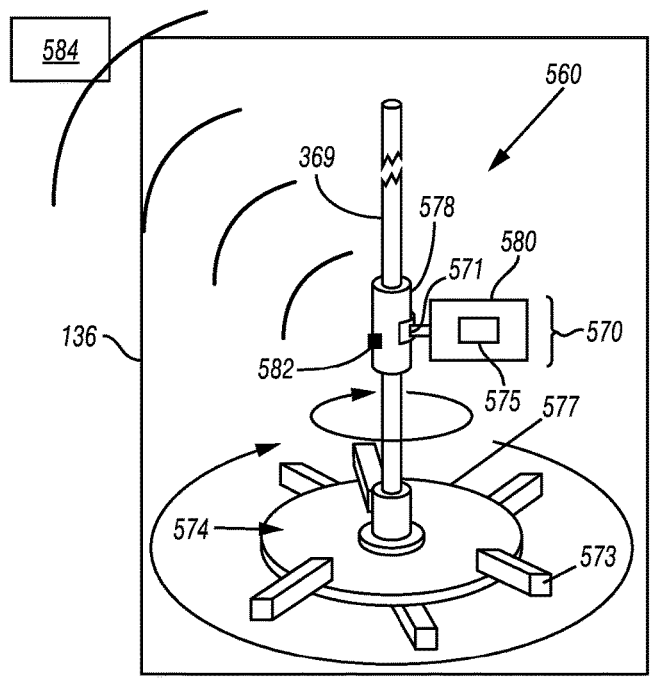
FIG. 5
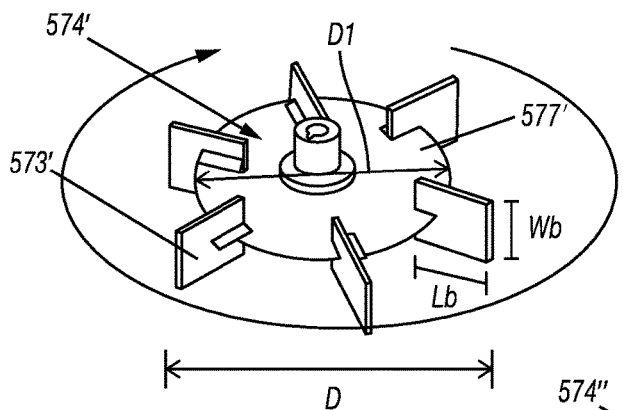
FIG. 6.1
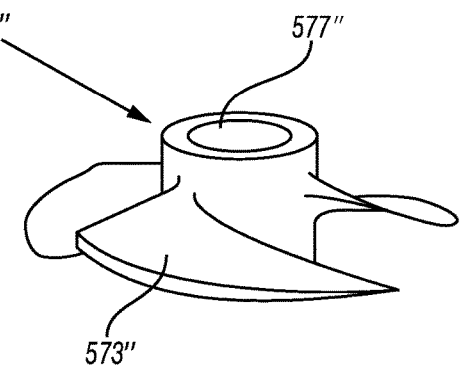
FIG. 6.2

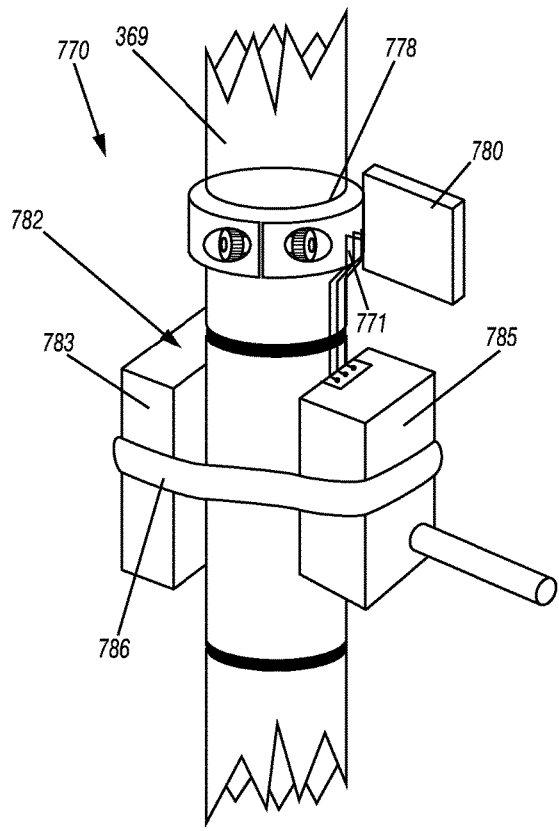
FIG. 7.1
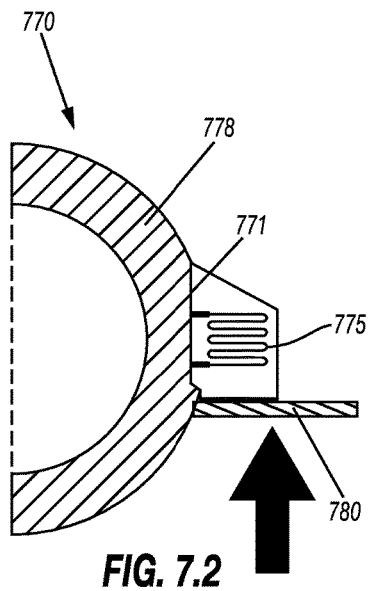
FIG. 7.2
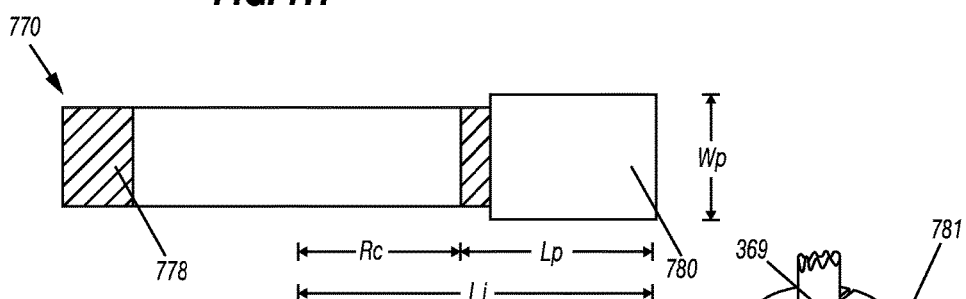
FIG. 7.3
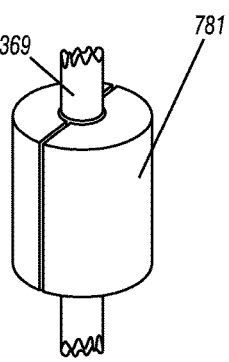
FIG. 7.4

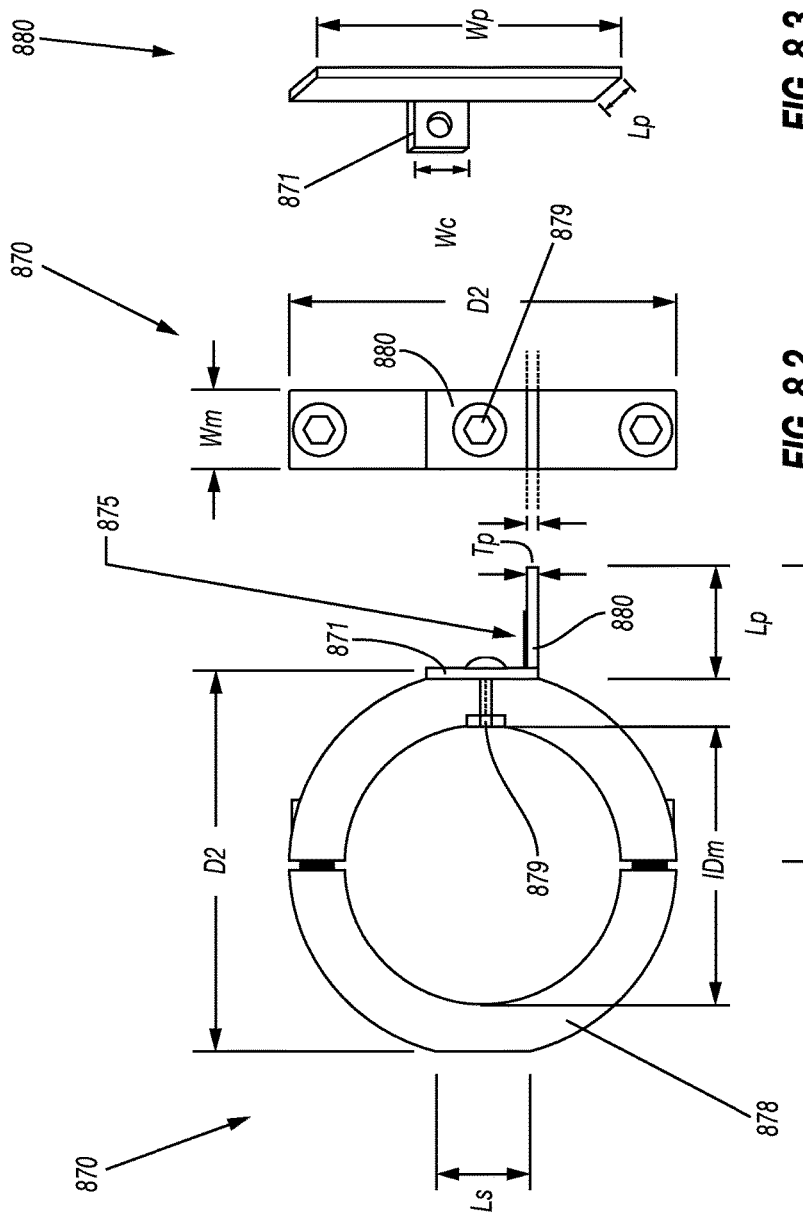

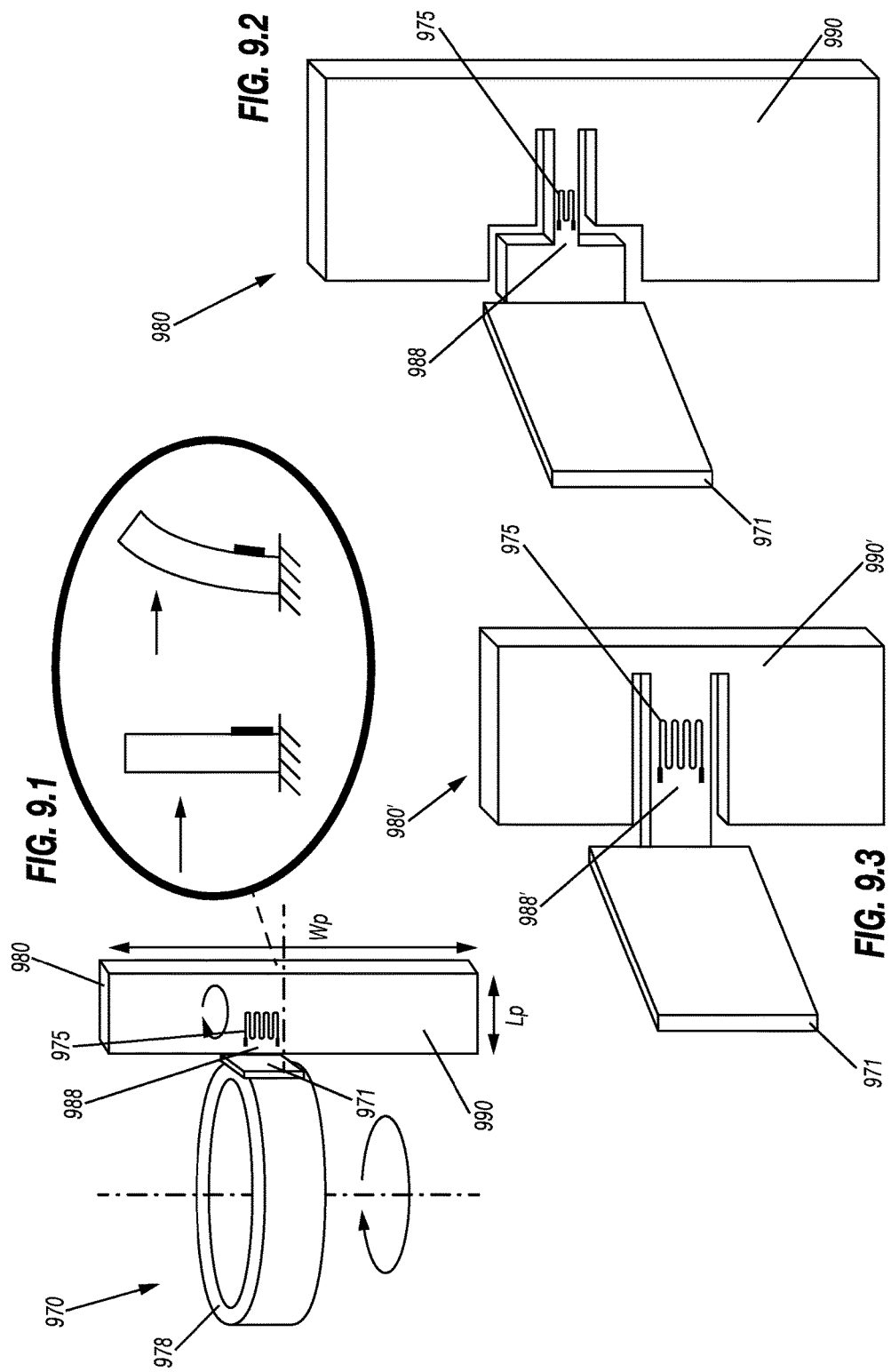

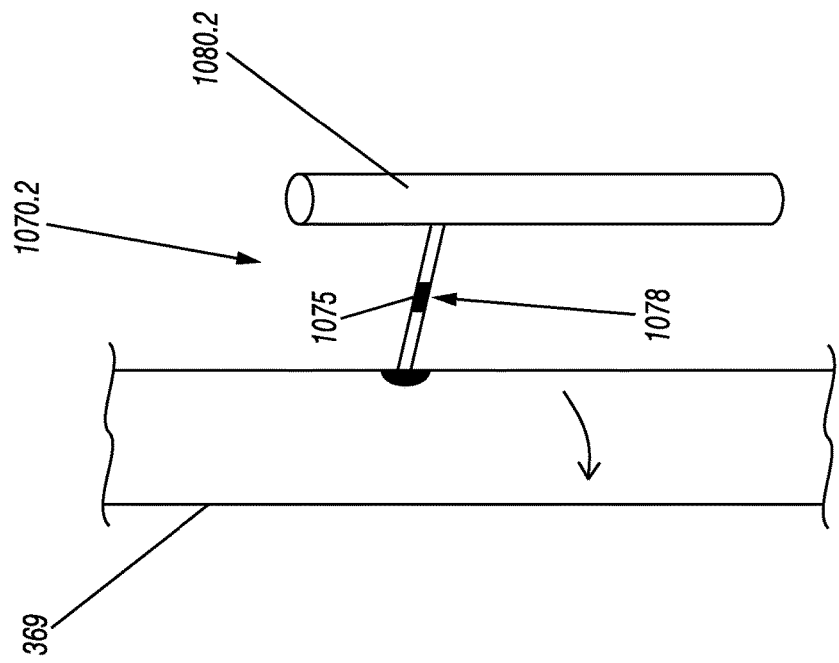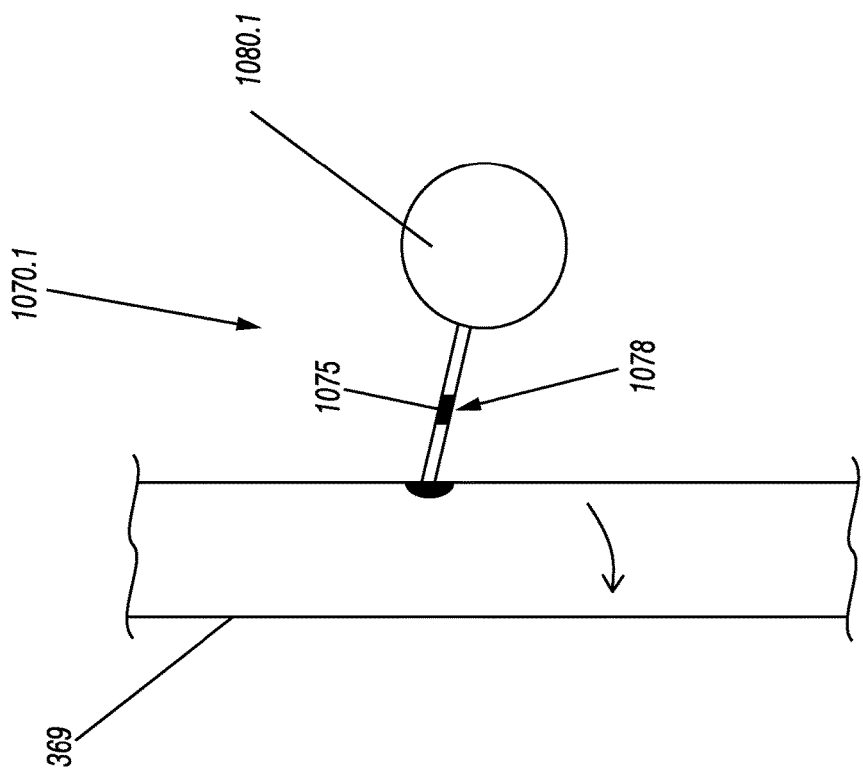

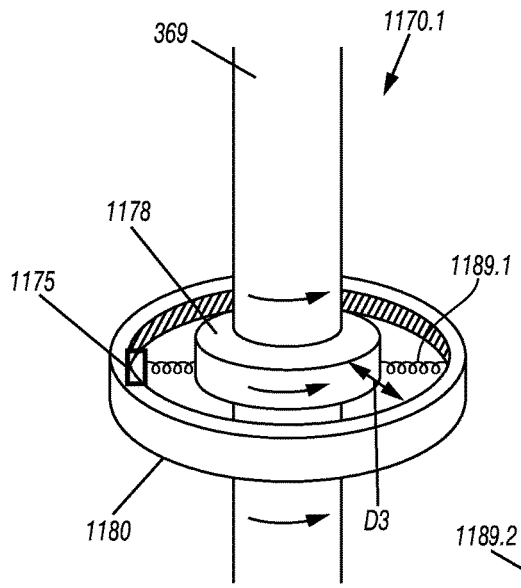
FIG. 11.1
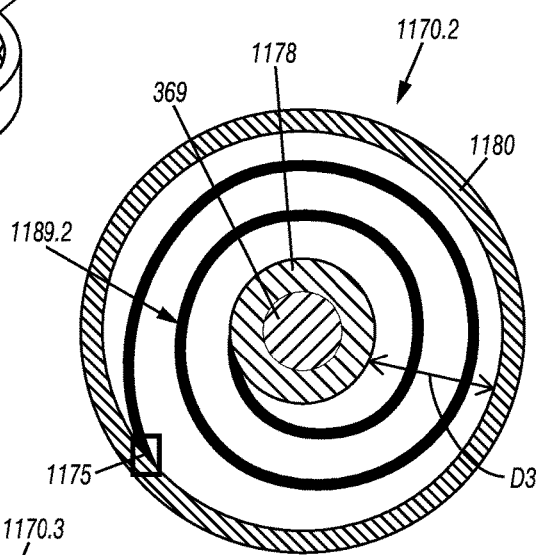
FIG. 11.2
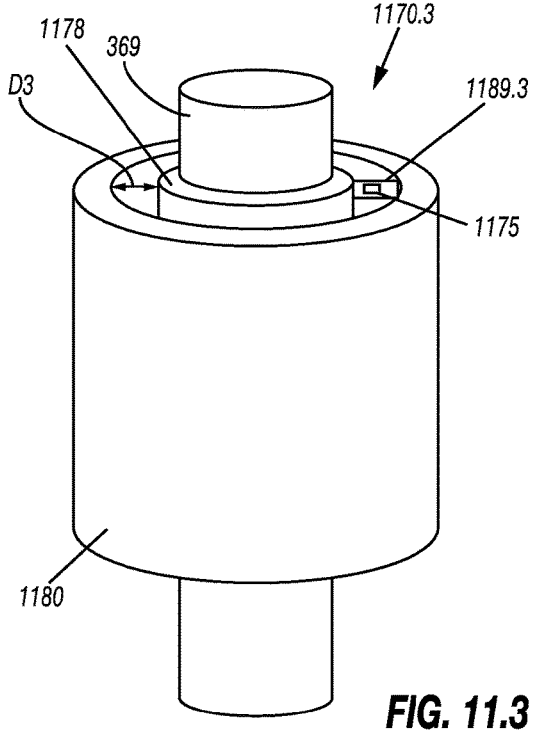
FIG. 11.3

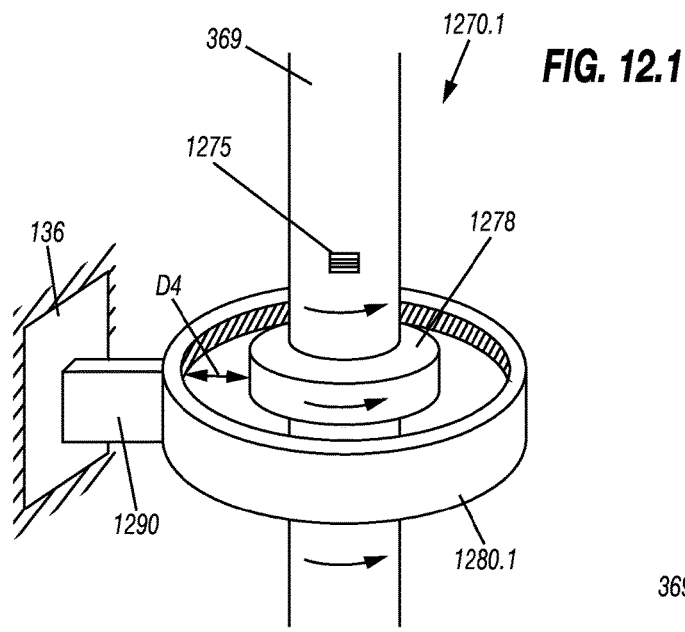
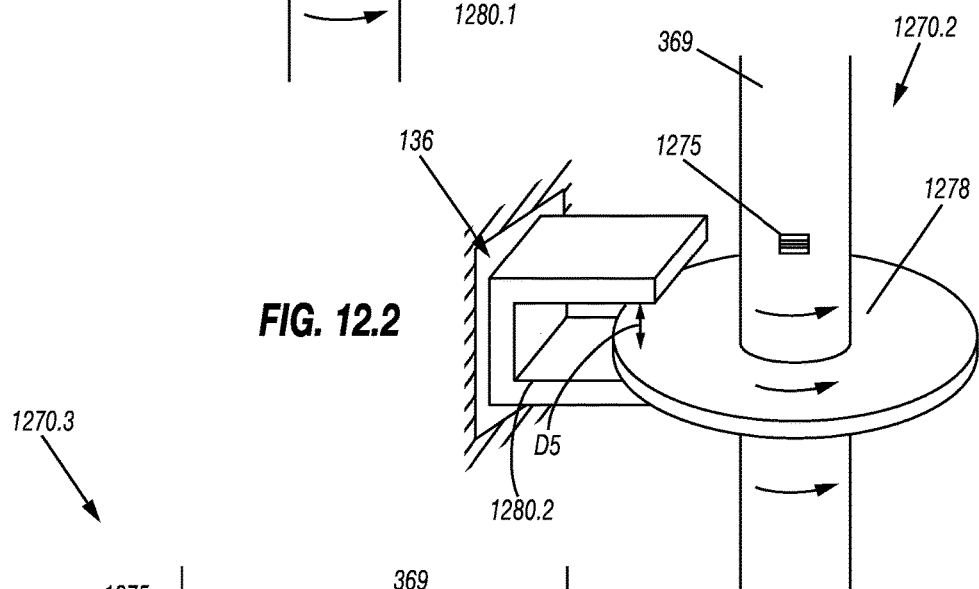
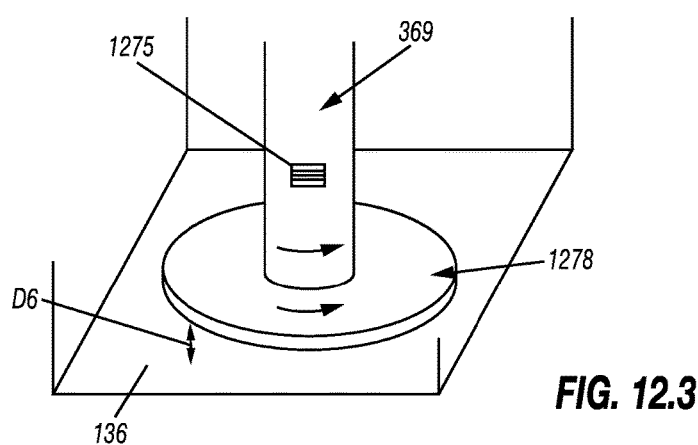
FIG. 12.1
FIG. 12.2
FIG. 12.3

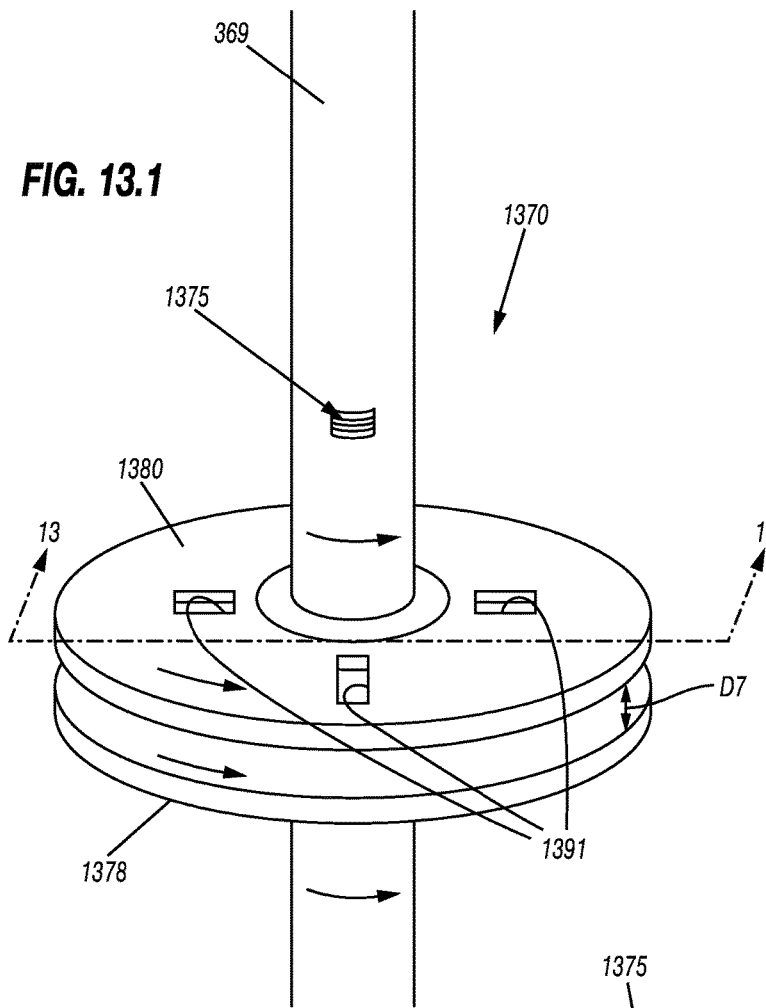
FIG. 13.1
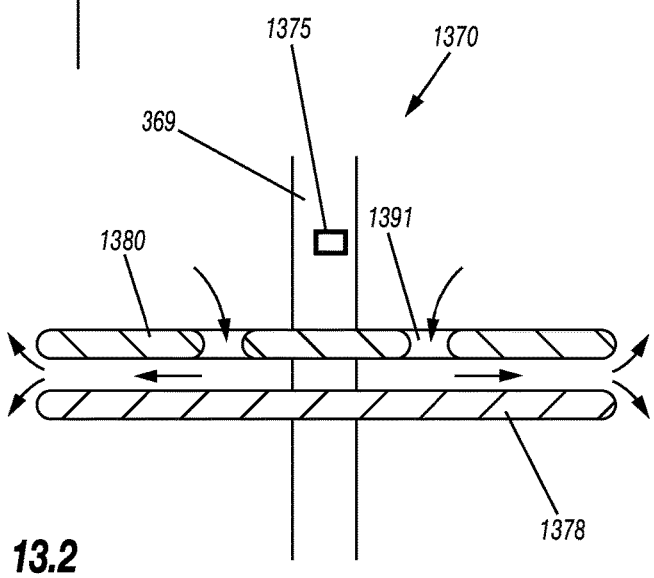
FIG. 13.2

WELLSITE MIXER SENSING ASSEMBLY AND METHOD OF USING SAME

BACKGROUND

The present disclosure relates generally to methods and systems for performing wellsite operations. More particularly, this disclosure is directed to techniques for performing treatment operations, such as mixing, pumping, injecting, fracturing, and/or monitoring.

In order to facilitate the recovery of hydrocarbons from oil and gas wells, the subterranean formations surrounding such wells can be hydraulically fractured. Hydraulic fracturing may be used to create cracks in subsurface formations to allow oil or gas to move toward the well. A formation is fractured by introducing a specially engineered fluid (referred to as "treatment fluid" or "fracture fluid" herein) into the formation through one or more wellbores.

Components of the treatment fluid may be mixed in tanks and pumped to the wellbores for injection. The tanks may include mixers that rotate to drive the fluid. Once mixed, the treatment fluid may be injected into the wellbores via an injection tool deployed into the wellbore. Examples of various wellsite equipment and/or methods are provided in US Patent/Application Nos. 2014/044508, 2013/0309052, 2008/066911, U.S. Pat. Nos. 8,127,844, 7,048,432, and 5,046,856, the entire contents of which are hereby incorporated by reference herein.

SUMMARY

In at least one aspect, the disclosure relates to a mixer sensing assembly of a mixer for mixing a wellsite fluid in a tank at a wellsite. The mixer includes a shaft driven by a driver and a paddle operatively connectable to the shaft and rotatable therewith. The mixing sensor includes a mount operatively connectable to the shaft, a fluid interface, and a mixing sensor. The fluid interface is responsive to flow of the wellsite fluid passing thereby, and is operatively connectable to the mount. The mixing sensor is operatively connectable to the mount, the fluid interface, and/or the shaft to measure a load applied to the thereto whereby fluid parameters of the wellsite fluid may be determined therefrom.

In another aspect, the disclosure relates to a mixer for mixing a wellsite fluid in a mixing tank at a wellsite. The mixer includes a shaft extending into the tank, a driver operatively connectable to the shaft to rotate the shaft, a paddle comprising a body and blades, and a mixing sensor. The paddle is operatively connectable to the shaft and movable therewith to drive the wellsite fluid in the mixing tank. The mixer sensing assembly includes a mount operatively connectable to the shaft, a fluid interface, and a mixing sensor. The fluid interface is responsive to flow of the wellsite fluid passing thereby, and is operatively connectable to the mount. The mixing sensor is operatively connectable to the mount, the fluid interface, and/or the shaft to measure a load applied to the thereto whereby fluid parameters of the wellsite fluid may be determined therefrom. The mixer of claim 16, wherein the body comprises one of a ring and a disc.

Finally, in another aspect, the disclosure relates to a method of mixing a wellsite fluid. The method involves selectively passing components of the wellsite fluid into a tank at the wellsite, and disposing a mixer in the mixing tank. The mixer includes a shaft, a paddle, and a mixer sensing assembly. The mixer sensing assembly includes a fluid interface and a mixing sensor. The method further involves forming a mixture by moving the components about the tank with the mixer such that the fluid interface of the mixer sensing assembly is in the path of the fluid and the mixer is movable thereby, and measuring a strain on the mixer with the mixer sensor.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of the wellsite mixing system with calibrator and mixer sensing assembly and related methods are described with reference to the following figures. The same numbers are used throughout the figures to reference like features and components.

FIG. 5 is a schematic diagram depicting a mixer with a paddle and a mixer sensing assembly;

FIGS. 6.1 and 6.2 are schematic diagrams depicting a flat blade and a turbine blade paddle, respectively;

FIGS. 7.1-7.4 are various views of a mixer sensing assembly in a clamp configuration;

FIGS. 8.1-8.3 are detailed views of a mixer sensing assembly in another clamp configuration;

FIGS. 9.1-9.3 are various views of a mixer sensing assembly in a hinged configuration;

FIGS. 10.1-10.2 are various views of a mixer sensing assembly in an arm configuration;

FIGS. 11.1-11.3 are various views of a mixer sensing assembly in a concentric configuration;

FIGS. 12.1-12.3 are various views of a mixer sensing assembly in a fixed configuration;

FIGS. 13.1-13.2 are various views of a mixer sensing assembly in a pump configuration.

DETAILED DESCRIPTION

The description that follows includes exemplary apparatuses, methods, techniques, and instruction sequences that embody techniques of the inventive subject matter. However, it is understood that the described embodiments may be practiced without these specific details.

The present disclosure relates to systems and methods for mixing wellsite fluids, such as treatment fluids. Components of the fluids may be mixed by a mixing system which includes inputs, a mixing tank, a mixer, and a calibrator. The components (e.g., gelling agent and water) are mixed in a series of mixing bins in the mixing tank to form a mixture, such as a gel. The components may be solid, liquid, gel, or other forms, and the mixture and fluid containing such components may be a fluid having fluid, solid, gel or other forms therein. The components may be a liquid, such as water, oil, water-based fluid, oil-based fluid, etc. The components may be a solid, such as a gelling agent, dry guar powder, cement, bentonite, clay, barite, calcium oxide, etc.

The mixing tank has mixers driven by a motor to mix the mixture. The mixer may include a shaft with a paddle rotatable in the mixing tank to blend the components. The calibrator includes a calibrator sensor (e.g., a load sensor, a strain gauge, a voltage meter, a current meter, a flow meter, a pressure transducer, etc.) to measure equipment parameters, such as strain on the mixers and/or load on the motors driving the mixers, so that fluid parameters, such as viscosity, may be determined.

During mixing, the viscosity of the mixture increases and the mixture hydrates as it passes from one mixing bin to another. The viscosity of the mixture applies a load to the mixers that is detectable by the calibrator sensor. Based on the loads on the mixers, the viscosity of the mixture may be estimated and the mixing adjusted to optimize the mixture. The viscosity estimation may be used, for example, to replace or eliminate equipment, such as downstream quality monitoring, and/or to provide in-situ, continuous, and/or upstream monitoring.

The mixing equipment may be used to measure fluid parameters in situ as the fluid is processed. This measurement may be performed upstream during the mixing to provide early detection before quantities of unusable or below quality fluid is generated. Early detection provides a chance to take corrective action and resolve detected quality issues while pumping. The measurements may also be compared with process quality control that may be performed downstream of the mixing to verify the fluid parameters, such as viscosity. Measurements by one or more monitors and/or other measurements (e.g., manual measurements) may be compared for validation.

Mixing Unit with Calibrator

Figure 1:
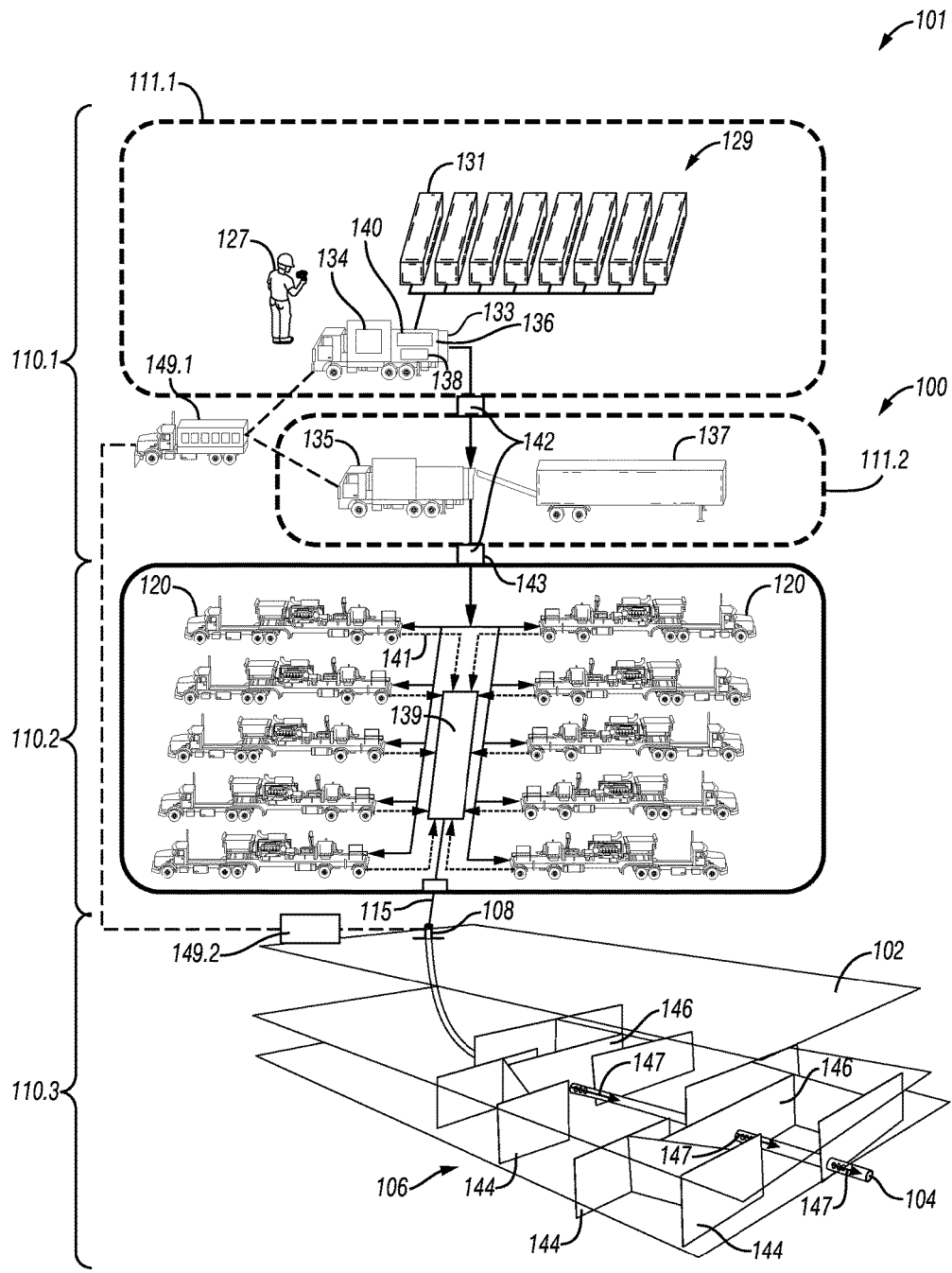
FIG. 1 is a schematic diagram illustrating a wellsite depicting a treatment operation including a mixing portion having a wellsite mixing system with a calibrator.

FIG. 1 depicts a treatment operation 101 about a wellsite 100. While FIG. 1 provides an example of mixing a treatment fluid, the mixing and calibrating techniques provided herein may apply to any mixing of wellsite or other fluids. The wellsite 100 has a wellbore 104 extending from a wellhead 108 at a surface location and through a subterranean formation 102 therebelow. A fracture network 106 extends about the wellbore 104. A treatment system 129 is positioned about the wellhead 108 for passing treatment fluid into the wellbore 104.

Various treatment fluids, such as conventional stimulation fluids with proppants, may be used as the treatment fluid. Other fluids, such as viscous gels (e.g., guar or guar gum), "slick water" (which may have a friction reducer (polymer) and water) may also be used to hydraulically fracture. Such "slick water" may be in the form of a thin fluid (e.g., nearly the same viscosity as water) and may be used to create more complex fractures.

The treatment system 129 includes a mixing portion 110.1, a pumping portion 110.2, and an injecting portion 110.3 to mix and pump treatment fluid from the surface to the wellbore 104 during a treatment operation. The treatment system 129 is depicted as being operated by a field operator 127 for recording maintenance and operational data and/or for performing the operation in accordance with a prescribed schedule.

The mixing portion 110.1 includes a mix portion 111.1 and a solids portion 111.2. The mix portion 111.1 may include water tanks 131 and a mix tank 134. The water tanks 131 may transport and store a mixing fluid, such as water or other fluids, for use in forming the treatment fluid. The mix tank 134 may transport and store a component, such as the gelling agent (e.g., guar), for use in forming the treatment fluid. The treatment fluid may be, for example, a non-Newtonian fluid. The water tanks 131 and mix tank 134 are fluidly connected to a mixing unit 133 to receive the components.

The mixing unit 133 includes a mixing tank 136 and calibrator sensor 138. The mixing tank 136 receives a component, such as water, from the tanks 131 and another component, such as gelling agent, from the mix tank 134 to form the mixture, such as gel. The mixture may be used, for example, to increase the viscosity of the treatment fluid, and to allow the proppant to be suspended in the treatment fluid. It may also act as a friction reducing agent to allow higher pump rates with less frictional pressure. The mixing unit may have other features, such as pumps, solids feeders, or other devices.

The calibrator sensor 138 may be provided about the mixing portion 110.1 to sense equipment parameters, such as load or strain on the mixing unit, and determine fluid parameters, such as viscosity of the mixture and/or its components. Additional measurement instruments 142 (e.g., composition analyzer, a viscometer, a meter (e.g., density, flow meter, etc.), gauges (e.g., temperature gauge, pressure gauge, etc.) detectors, etc.) may be provided about the system to measure parameters of the mixture. For example, viscosity of the fluid is dependent on fluid temperature, so a measurement of fluid temperature may be made using a temperature gauge.

One or more sensors 138 and/or measurement instruments 142 may be positioned about the mixing portion 110.1 (or other portions of the wellsite 100). For example, sensors 138 may be provided about the mixing unit 133 to provide information at an upstream part of the mixing portion 110.1, and the measurements instruments 142 may be provided downstream therefrom. Manual measurements may also be made.

A mixing controller 140 is operatively connected to the mixing tank 136. The mixing controller 140 may adjust the mixing portion 110.1 based on readings from the sensor(s) 138 and/or measurement instrument(s) 142. The mixing controller 140 may be used to selectively adjust amounts of the components, such as water from water tanks 131 and/or gelling agent from the mix tank 134, input into the tank 134 to form a treatment fluid at desired parameters, such as a desired viscosity or composition.

Once mixed, the mixture is then sent to the solids portion 111.2 where it is mixed with a proppant from a proppant transport 137 by a blender 135 to form the treatment fluid. The treatment fluid is then pumped from the blender 135 to treatment trucks 120 with plunger pumps as shown by lines 143. Each treatment truck 120 receives the treatment fluid at a low pressure and discharges it to a common manifold 139 (sometimes called a missile trailer or missile) at a high pressure as shown by lines 141. The missile 139 then directs the treatment fluid from the treatment trucks 120 to the wellbore 104 as shown by line 115.

One or more treatment trucks 120 may be used to supply treatment fluid at a desired rate. Each treatment truck 120 may be normally operated at any rate, such as well under its maximum operating capacity. Operating the treatment trucks 120 under their operating capacity may allow for one to fail and the remaining to be run at a higher speed in order to make up for the absence of the failed pump.

The treatment fluid may be delivered to the wellbore 104 by injection tool 147 to fracture the formation 102. As shown, the fracture network 106 with fractures is located at various positions around the wellbore 104. The various fractures may be natural fractures 144 present before injection of the treatment fluid, or hydraulic fractures 146 generated about the formation 102 during injection.

During the hydraulic fracturing service, the treatment fluid is injected into the formation 102 causing fractures in the rock and holding them open to allow for oil to be extracted from more area. In order for a fracturing job to be performed, a fluid may be provided that matches the requirements for each particular application. The fluid may be mixed on site from a variety of the components.

The viscous gel (or other mixture) may be created in order to suspend proppant that is pumped downhole to keep the fractures propped open. During mixing, various parameters may be measured by sensor 138, such as load and/or strain used to determine viscosity. The viscous nature of the fluid may be used, for example, to carry proppant downhole through the wellbore 104 and perforations and into the formation 102, and to prevent the proppant from "falling out" of the fluid or causing a "screen out." A screen out may occur when the proppant carried in a treatment fluid creates a bridge across perforations in the formation 102 or similar restricted flow area. This may create a sudden restriction to fluid flow that causes a rapid rise in pump pressure. Consequently, the fracturing operation may come to a halt. The wellbore 104 may then have to be cleaned out (e.g., with coiled tubing) before preparing for re-fracturing the formation 102.

In order to prevent such an event, the viscosity of the mixture may be monitored by sensor 138 and the feedback used to adjust the mixture to meet the desired requirements. Calibrating (or monitoring) may also be performed by intermittent sampling of the mixture. For example, a sample may be manually collected downstream of the mixing, and tested onsite using a bench-top instrument, such as a Fann 35 viscometer. In order to obtain real time measurements, measurements may be performed during the mixing to enable adjustments in the mixing early in the process before large quantities of the fluid is made.

The calibrator sensor 138 may be used to continuously measure equipment parameters, such as the load and/or strain, used to determine fluid parameters, such as viscosity of the mixture, and to provide real time feedback. The sensor 138 may be incorporated to provide a self-controlled feedback system that changes the input rate of components, such as dry powder feeder rate to adjust the viscosity of the mixture.

Wellsite controllers 149.1,149.2 may also be employed to direct part or all of the treatment system 129 or other operations during the treatment operation. One or more controllers may be positioned about various portions of the wellsite 100 to collect data, analyze data, and/or perform operations. Information from the mixing portion 110.1, portions of the wellsite 100, and/or other data may be collected and analyzed by one or more of the controllers (e.g., the mixing controller 140 and/or the wellsite controllers 149.1, 149.2).

The controller(s) may be used to provide feedback by sending instructions and/or commands for taking various automatic and/or manual actions at the wellsite 100. The controllers may be coupled to portions of the wellsite to activate certain devices, such as feed valves. For example, the controller 140 may be used in combination with the sensor 138 to form a calibrator to monitor and control mixing operations. The calibrator as used herein relates to the monitoring, collection of data, data analysis, feedback, operation, and/or control of the mixing herein, and involves measuring wellsite parameters, such as equipment parameters (e.g., load and/or strain on the mixing unit) and/or fluid parameters (e.g., viscosity).

Figure 2:
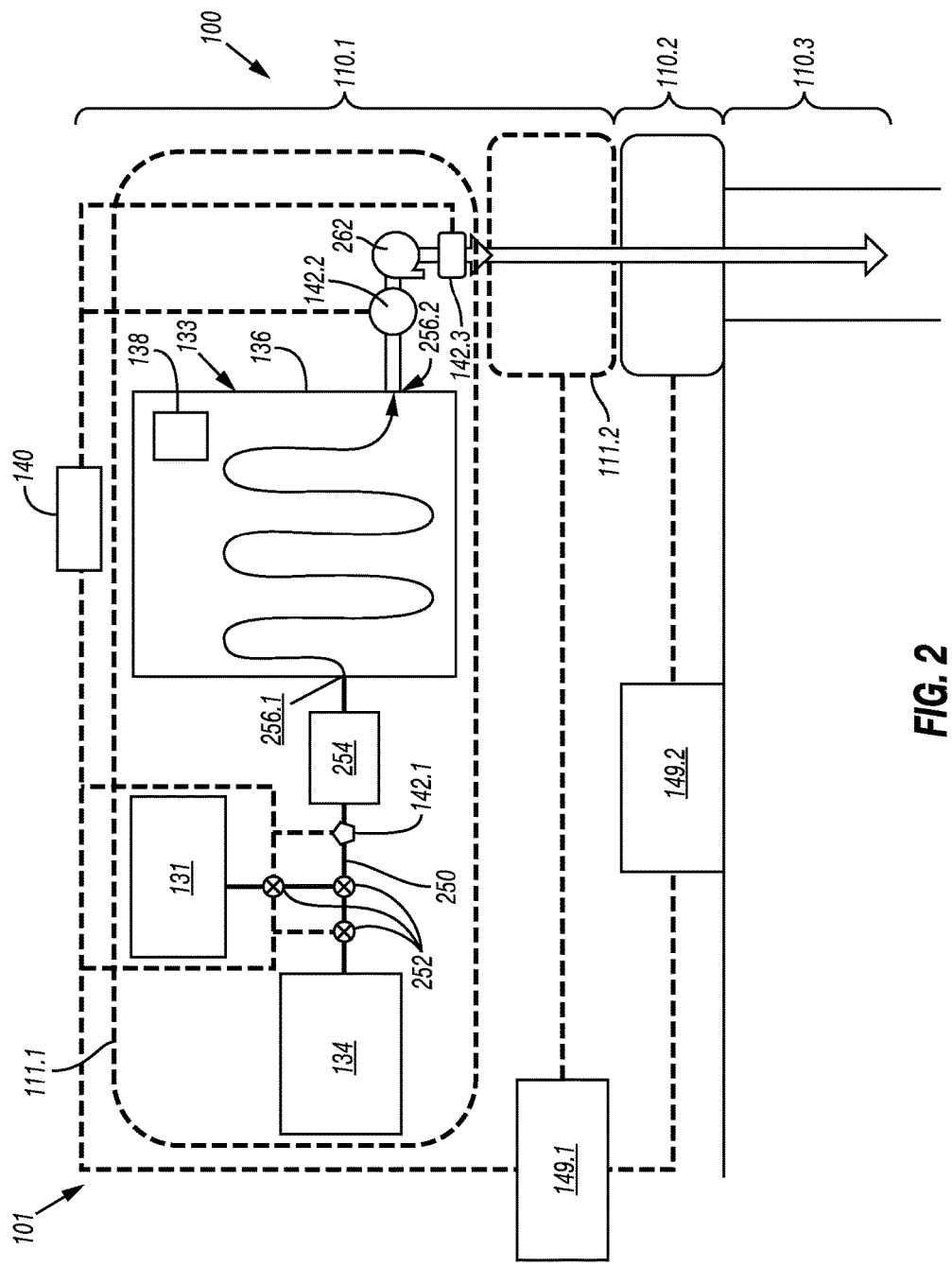
FIG. 2 is a schematic diagram illustrating the mixing portion of FIG. 1 in greater detail.

FIG. 2 is a schematic view the wellsite 100 depicting the mix portion 111.1 in greater detail. As shown in this view, the water tank 131 and the mix tank 134 feed into the mixing tank 136 via inputs (e.g., flowlines) 250. Feed valves 252 are provided to selectively permit the release of components, such as water from tank 131 and gel from tank 134, through the flowlines 250 and into the mixing tank 136.

Feed valves as used herein refers to any device capable of permitting components (solid or liquid) to pass into the mixing tank 136, such as valves, pumps, feeders, or flow control devices, such as restrictors, valves, pumps, etc. For example, the feed valves may be in the form of pumps to permit a specified rate of component to enter the mixing tank 136.

As shown in this view, a dispenser 254 may also be provided along the flowlines 250 to receive the components (e.g., water and gelling agent and carrier material, if present) before it enters the mixing tank 136. The dispenser 254 may provide for the addition of other carrier materials, such as hydrophilic polysaccharide, fibers, and/or other non-Newtonian materials, to the mixture. The carrier materials may be used, for example, in the treatment fluid to facilitate the dispensing of proppant through the fluid.

The components passes from the flowlines 250 into the mixing tank 136 via an inlet 256.1. The fluid passes into inlet 256.1, through the tank 136, out outlet 256.2, and on to solid portion 111.2. Pump 262 may be provided to draw the fluid through the mixing tank 136.

The mixing tank 136 provides a flow path extending from the inlet 256.1 to the outlet 256.2 for passage of the mixture during mixing as indicated by the curved arrow. This flow path extends through the mixing tank 136 in a first in, first out configuration. When mixing the components, the mixture may take a residence time of about 3 minutes in the mixing tank 136. The mixture may hydrate as it passes through the mixing tank 136.

Various monitors may be provided about the mix portion 111.1. For example, the sensor 138 may include various mixing sensors and/or sensor assemblies used to measure parameters of the mixing equipment and/or fluid passing therethrough. In another example, the measurement instrument 142 (FIG. 1) may include one or more measurement instruments, such as a composition analyzer 142.1, a viscometer 142.2, and/or a gauge 142.3 (e.g., pressure, temperature, density, viscosity, etc.) Stationary vanes, turbines, or existing pipes may be exposed to flowing fluid to measure viscosity of fluid flow through the mixing tank 136.

The controller 140 is coupled to the mixing tank 136 and the feed valves 252. The controller 140 may receive information from the mixing sensor 138 and/or the measurement instruments 142.1-142.3. The controller 140 may then process and analyze the data. The controller 140 may be coupled to one or more other controllers, such as controllers 149.1, 149.2.

Based on the data collected, the controller 140 may send instructions and/or commands to one or more portions of the wellsite 100. The controller(s) may send signals to the feed valves 252 and/or other portions of the wellsite 100 to take action. For example, the controller 140 may send a signal to feed valves 252 to control the flow of components, such as fluid from water tank 131 and/or gelling agent, from mix tank 134 into inlet 256.1. A feedback loop may be provided by receiving data from the sensor 138 and/or measurement instruments 142.1-142.3, and adjusting the feed valve 252 based on the data received therefrom. The feedback may be used to calibrate the mixing operation and/or optimize the fluid passing from the mix portion 111.1.

Figure 3:
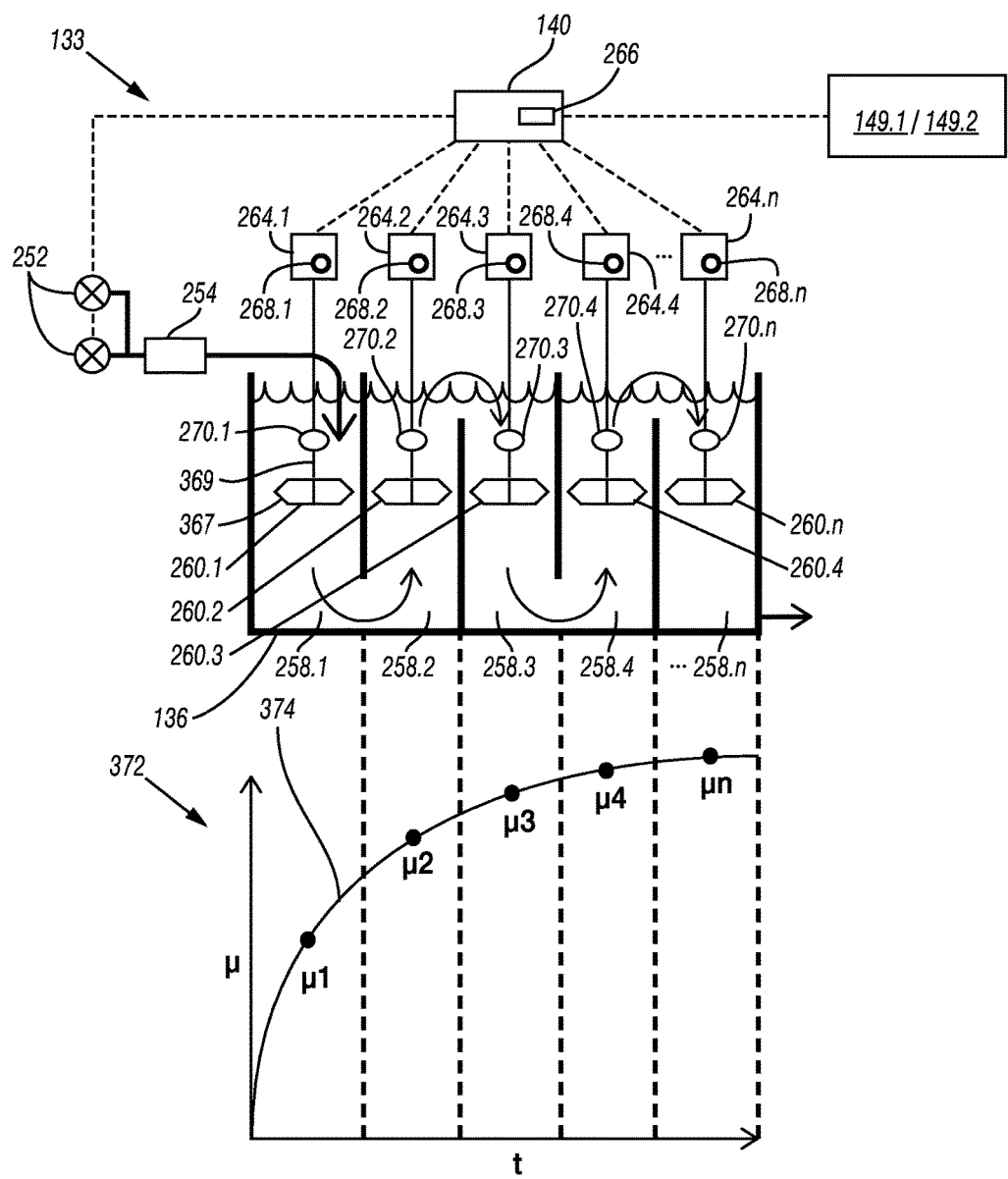
FIG. 3 is a schematic diagram illustrating operation of the mixing portion.

FIG. 3 is a schematic diagram showing the mixing unit 133 in greater detail. This diagram depicts the flow of the mixture through mixing tank 136, and the viscosity ($\mu$) of the mixture as it passes therethrough. The mixing tank 136 has multiple bins 258.1-.n with mixers 260.1-.n therein. While five bins 258.1-258.n are shown, the mixing tank 136 may have 2 or more bins. The bins permit flow through the mixing tank 136 in a first in, first out process.

The fluid is mixed in the bins 258.1-.n by the mixers 260.1-.n. While five mixers 260.1-260.n are shown, the mixing tank 136 may have one or more mixers 260.1-.n. In some cases, some bins may have a mixer and some may be without a mixer. The mixer may be, for example, a Precision Continuous Mixer (PCM) or other mixer capable of mixing water with dry powder in specified concentration so as to obtain a mixture with desired fluid properties. Examples of mixers are disclosed in U.S. Pat. No. 5,046,856, previously incorporated by reference herein.

Each mixer 260.1-260.n is driven by a corresponding motor (or driver) 264.1-264.n, respectively. The mixers may each have a paddle (or impeller) 367 with a shaft 369 extending therefrom. The paddle 367 may be rotationally driven via shaft 369 by a corresponding motors 264.1-.n.

Calibrator sensors may be in the form of mixing sensors 270.1-270.n and motor sensors 268.2-.n. The calibrator sensors may be mixing sensors 270.1-.n provided on each of the mixers 260.1-.n to measure load and/or strain applied thereto. The calibrator sensors may also be motor sensors 268.1-.n provided about motors 264.1-.n to detect motor parameters (e.g., torque, load, current, fluid levels, etc.) of the motors 264. The motor sensors 268.1-.n and calibrator sensors 270.1-.n collect data (e.g., measurements of motor parameters or mixing parameters) from the motors 268.1-.n and mixers 260.1-.n, respectively. The motor sensors 268.1-.n and calibrator sensors 270.1-.n may be, for example, a strain gauge, voltage meter, fluid gauge, pressure transducer, or other device capable of measuring motor parameters, such as current, displacement of hydraulic fluid, load, etc.

The mixing sensors 270.1-.n may be, for example, strain gauges capable of measuring strain applied to the mixer 260.1-.n. As shown, the mixing sensor 270.1-.n is positioned along the shaft 369 to detect load applied thereto, for example, as the fluid viscosity resists rotation of the mixer 260.1-.n. The mixing sensor 270.1-.n may measure, for example, torque along the shaft 369 at a given speed.

The mixers 260.1-.n may be driven at a slower speed during measurements such that laminar flow of fluid is induced to provide a more accurate measurement. The shaft 367 may be provided with one or more sensors 270.1-.n, and paddles 367 with identical dimensions may be used to provide serial measurements of the mixers 260.1-.n over the flow time span across the mixing tank 136.

The motors 264.1-.n may be, for example, electric or hydraulic motors driven by a power source, such as current to drive the electric motor, or a hydraulic source, such as hydraulic fluid to drive the hydraulic motor. Shaft torque/delivered power may be measured by power transducers on alternating current (AC) motors, from a variable frequency drive (VFD), from hydraulic pressure measurements, or from reaction torque measurements on motor mounts.

Figure 4:
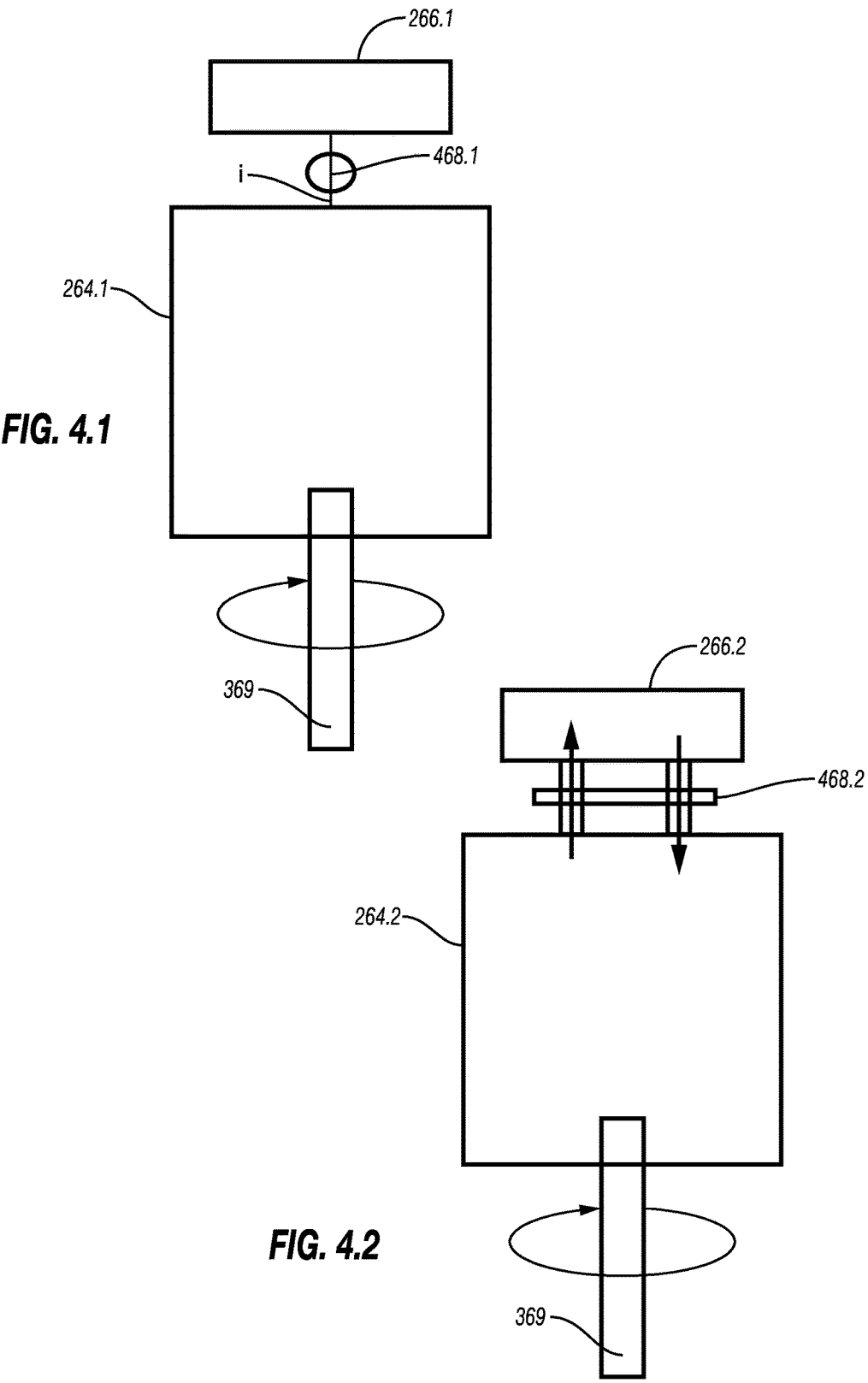
FIGS. 4.1 and 4.2 are schematic diagrams illustrating a driver of the wellsite mixing system in a hydraulic and an electric configuration, respectively.

FIGS. 4.1 and 4.2 show example motors 264.1 and 264.2 with corresponding motor sensors 468.1, 468.2. As shown in FIG. 4.1, the motor 264.1 has motor sensor 468.1 in the form of a current (or amp) meter that measures the current drawn by the motor 264.1 from power source 266.1 as the shaft 369 of the mixer is rotated. As shown in FIG. 4.2, the motor sensor 468.2 is a flowmeter that measures the hydraulic fluid passing to and from the motor 264.2 from a hydraulic fluid source 266.2 as the shaft 369 is rotated. Measurements taken by the current meter 468.1 and the flow meter 468.2 may be passed to the controller 140.

Referring back to FIG. 3, the sensors 268.1-.n, 270.1-.n, and measurement instruments 142 are communicatively coupled to the controller 140 via communication links as indicated by the dashed lines. The feed valves 252 are also communicatively coupled to the controller 140. The controller 140 may be communicatively coupled to other controllers, such as controllers 149.1, 149.2 as shown. The controllers may receive data collected from measurements taken by the sensors 268.1-.n, 270.1-.n and measurement instruments 142.

FIG. 3 also includes a graph 372 depicting viscosity ($\mu$) of the fluid as it passes through each of the bins 258.1-.n. The graph 372 plots viscosity ($\mu$) (y-axis) versus time (t) (x-axis) of the fluid. As indicated by line 374 of the graph 372, due to hydration, the viscosity increases as the fluid passes through the bins 258.1-.n.

Fluid flowing through the mixing tank 136 passes sequentially through bins 258.1-.n at viscosities $\mu 1$-$\mu n$, respectively. Fluid pass sequentially into the bins 258.1-.n and is mixed by mixer 260.1-.n therein at a viscosity $\mu 1$-$\mu n$, respectively.

The calibration sensors may measure the load on each motor 264.1-.n with motor sensors 268.1-268.n. The calibration sensors may measure the strain on the mixers 260.1-260.n with the mixing sensors 270.1-.n. Strain on the mixers 260.1-.n may also be used to determine viscosity of the fluid. The measured load across the motors 264.1-.n and/or strain on the mixers 260.1-.n at a given speed may be an indication of fluid viscosity in each of the bins 258.1-.n.

The measured loads and/or strain may be converted into fluid parameters (e.g., viscosity) using, for example, torque determined by measuring the differential hydraulic pressure of the hydraulic motor or from the electric motor by an analysis of the AC current as power/speed. Torque on the electric motor may be measured while sweeping the rpm range of the mixture to evaluate the viscosity of the non-Newtonian fluid to enhance resolution. A comparison of load, such as shaft torque in different bins of the mixing tank or in the same bin over time, may be compared with reference values to yield information about the mixture quality, such as gel concentration level in different tanks.

Fluid parameters, such as viscosity, may be estimated based on the gel concentrations. The estimated parameters may be compared with expected parameters for a desired treatment fluid. Where the estimated parameters are outside a predetermined range, the amount of components (e.g., fluid and gelling agent) may be adjusted, thereby altering composition and corresponding fluid parameters. For example, the feed valves 252 may be adjusted to change the amount of fluid to gelling agent thereby changing the viscosity of the mixture. The feed valves 252 may be adjusted until the viscosity of the mixture is within a range of the expected viscosity. The adjustment of various portions of the system in response to measured load may be used to calibrate the system in a feedback loop.

Assuming laminar flow for a non-Newtonian fluid passing through the mixing tank 136, a dimensionless ratio of the following power number may be obtained by operating the mixer in turbulent region and in laminar region.

$$\text{Power Number} = \text{Power}/(\text{density} \cdot \text{RPM}^3 \cdot \text{mixer\_dia}^5) \quad \text{Eqn. (1)}$$

This ratio of these two numbers may be less sensitive to mixer geometry and condition. Using mixer power rather than torque may be used to reduce the effect of no-load power draw.

The load for each mixer 260 or the same mixture over time may be compared to determine when hydration of the fluid is complete. The rate of change of viscosity/power versus time/tank position may approach a limiting value when hydration is complete. The mixer(s) 260 may be run at multiple speeds where the measuring shear rate is similar to the standard shear rates of a viscometer (e.g., Fann 35) to develop a correlation where the mixer power data may be reliably translated to viscometer equivalents. The mixer operating parameters, such as load, strain, power, and/or torque, may be used to detect excessive fluid aeration. These calculations may be used to compare the viscosity using one or more mixers and/or one or more mixing parameters, such as flow rate, mixing rate, etc., optimize the speed and geometry for measuring viscosity.

The estimated parameters may also be compared with parameters as measured by the measurement instruments 142 and/or by other devices. Other equipment and/or fluid parameters may also be evaluated using the various sensors 268, 270, the measurement instruments 142, and/or by other manual or instrument measurements.

Other measurements and/or analyses may be performed. The measurements and estimated parameters may also be used to determine other information about the mixing and/or wellsite portions of the wellsite operations and to take action in response thereto. For example, overhead mixers in an empty tank may be calibrated to measure the frictional losses and other noise amplitudes that can be subtracted from the measurement. Other examples of possible applications include a comparison of bottom pressure measurements with direct level measurements to detect and quantify aeration of the fluid.

Mixer with Mixing Sensor Assemblies

FIGS. 5-13 depict various views of sensor assemblies usable with the mixing assembly 133 of FIG. 13. These sensor assemblies may be used to measure strain on mixers of the mixing assembly. Assemblies in FIG. 5-10 are based on measuring the strain caused by viscous drag force on a rotating object; while, assembles in FIG. 11-13 are based on measuring the strain caused by the fluid shear stress between rotating components. As shown in FIG. 5, the mixer 560 includes a shaft 369, a paddle 574 with blades 573, and a mixer sensing assembly 570 with a mixer sensor 575 to measure mixing parameters, such as strain on the mixer 560, which may be used to determine viscosity of the fluid. The various mixers and portions thereof may be made of various materials, such a metal (e.g., stainless steel 304).

The paddle 574 is rotationally mounted to a bottom end of the shaft 369. The shaft 369 is rotated by a motor (e.g., 264.1-$n$ of FIG. 3) rotates of paddle 574. Paddle 574 is provided with blades 573 to facilitate mixing of the components of the fluid. The paddle 574 of FIG. 5 has a body (circular disc) 577 with elongate, cuboid (rectangular prism) blades 573 extending therefrom.

As shown in FIGS. 6.1 and 6.2, the paddles 574', 574" may be the same as paddle 574, except that the blades are flat (plate) blades 573' or turbine (curved) blades 573". The paddle 574' may have a body 577' in the shape of a disc, and paddle 574" may have a body 577" in the form of a ring. For example, the paddle 574' may have a diameter D (radius R=D), and the blades 573' may have a width Wb and a length Lb. The length Lb may be ¼ D and the width Wb may be ⅕ D. A diameter D1 of the disc 577 is ⅔ of the diameter D of the paddle 574'.

FIGS. 5, 6.1, and 6.2 show various configurations of the mixer paddle 574, 574', 574". While FIGS. 5 and 6.1-6.2 show the paddle as being in a horizontal orientation at a bottom end of the mixer 560, it will be appreciated that the paddle may be at various orientations. For example, the paddle may be rotated 90 degrees such that the paddle is parallel to the flow.

The shape and dimensions of the paddle may be defined to provide laminar flow and to maintain a laminar flow regime. Examples of laminar flow are provided in James Y. Oldshue, Fluid Mixing Technology James Y. Oldshue (1982), the entire contents of which are hereby incorporated by reference herein. Laminar flow is defined by the following equation:

$$N_{Re} = \frac{10.754 N * D^2 * \rho}{\mu} \quad \text{Eqn. (2)}$$

where $N_{Re}$ is the Reynolds number, N is rotational speed (rpm), D is diameter (in), $\rho$ is the fluid density (specific gravity), and $\mu$ is the dynamic viscosity of the fluid (cP). In an example where $N_{Re}$=5, N=220, and $\mu$=100, Eqn (2) is rewritten as follows:

$$5 = \frac{10.754 * 220 * D^2 * \rho}{100} \quad \text{Eqn. (3)}$$

To maintain laminar flow where $N_{Re}$<1000, the paddle may be provided with a diameter D<=6.5 in (16.51 cm), a length L<=1.625 in (4.1275 cm), and a width W<=1.3 in (3.30 cm). The length Lb may be, for example, 1.5 in (3.81 cm) and the width Wb may be, for example, 1.2 in (3.05 cm) to provide laminar flow. In another example, the shape of the blades may be defined (e.g., curved) to provide lift measurements correlated with viscosity under laminar flow conditions. The lift can be translated to a pull on a spring. The tension of the spring can then be used as a measure of the viscosity.

Referring back to FIG. 5, the sensor assembly 570 includes a mount 578, a fluid interface 580, and a mixing sensor 575. The mount 578 of FIG. 5 is depicted as a clamp disposed about the shaft 369. The mount 578 has a hole therethrough to slidably receive the shaft 369. The fluid interface 580 is depicted as a flat member, similar to blade 573', supported on the mount 578 by support 571. The fluid interface 580 extends a distance radially from the shaft 369 for engagement by the fluid flowing in the tank 136.

The fluid interface 580 may be located such that the sensor 575 is positioned in the circular flow of the fluid in the mixing tank. The fluid interface 580 may be configured to receive a force generated by the fluid as the shaft 369 is rotated. This force may be larger when the fluid is thick and viscous, and smaller when the fluid is thin. This force may cause a small deflection in the fluid interface 580 detectable by the sensor 575. The sensor 575 may be, for example, a strain gauge capable of detecting strain caused by the force on the fluid interface 580.

The strain measurement may be used to determine viscosity of the fluid. The shaft 369 is fitted with a disc 577 with known diameter and thickness that may be used to measure viscosity. As the disc 577 rotates with the shaft 369, the strain caused on the shaft 369 can be correlated with viscosity. For a given rotational speed, a shear rate that the fluid experienced around the disc 577 is dependent on a diameter D1 of the disc. The strain (and/or load) on the mixer (e.g., the disc and the mixer paddles 574, 574', 574") may be measured by sensor 268 and passed to the controller 140.

The sensor 575 may produce an electronic signal that differs proportionally with the strain on the fluid interface 580, which is then proportional to the force. This electronic signal may be transferred by a transmitter 582 to a receiver 584. The receiver 584 may be located anywhere, such as on the mixer, at the wellsite, or offsite. Various portions of the mixer 560, such as the transmitter 582, sensor 575, and other parts may be enclosed in a waterproof shield to prevent disturbance and wear. The shield may allow wireless data, such as signals from the sensor 575 and/or transmitter 582, to pass therethrough.

One or more sensing assemblies 570 and/or sensors 575 may be provided at various portions of the mixer 560 (or other portions of the mixing system). Data received from the sensor(s) 575 may be used for manual and/or automatic control of the mixing. Data from the sensors 575 may be compared and/or validated against other measurements taken from the system.

The mixing may be adjusted to reach a defined target. The mixing controller 140 may be used to collect the data and to optimize performance of the treatment operation 101 and/or mixing unit 110.1 (FIGS. 1-3). This control system can be optimized using a proportional, derivative, and/or integral control algorithm. A closed loop system with feedback can be implemented using data from the sensor assemblies 570, sensor(s) 575 and/or other inputs.

FIGS. 7.1-8.3 show various versions of sensor assemblies having a clamp configuration. FIGS. 7.1-7.4 show another version of the sensor assembly 770. FIG. 7.1 shows the sensor assembly 770 on the shaft 369. FIGS. 7.2 and 7.3 depict horizontal and longitudinal cross-sectional views of portions of the sensor assembly 770. In this version, the sensor assembly 770 includes a mount 778, a fluid interface 780, a transmitter 782, and a sensor 775.

The mount 778 includes a two-piece clamp disposable about the shaft 369 and secured with a connector (e.g., bolt). The fluid interface 780 is supported on the mount 778 by support 771 and positioned in the flow path of the fluid as indicated by the arrow. Support 771 may be a bracket, hinge or other connector. The sensor 775 is positioned on the fluid interface 780 on support 771. The sensor 775 may be positioned adjacent to the mount 778 to sense movement thereof. As shown, the mount 778 and fluid interface 780 may have dimensions of a fluid interface width Wp, fluid interface length Lp, clamp radius Rc, and interface length Li. In an example, Wp=1.2 in (3.05 cm), Lp=1.75 in (4.45 cm), Rc=1.5 in (3.81 cm), and Li=3.25 in (8.26 cm).

The transmitter 782 in this version includes electronics 785 and power source 783 attached to the shaft 360 by a securing band 786. The electronics 785 may be, for example, a transceiver or other device capable of providing wireless communication. The power source 783 may be, for example, a battery to power the electronics 785 and/or sensor 775 to enable data collection and transmission. The sensor assembly 770 may also optionally be provided with a cover 781 to enclose sensitive electronics and prevent them from exposure to fluid (e.g., waterproof).

FIGS. 8.1-8.3 show another version of a sensor assembly 870. FIG. 8.1 shows a top view of the sensor assembly 870. FIG. 8.2 shows a side view of the sensor assembly 870. FIG. 8.3 show a side view of the fluid interface 880. In this version, the sensor assembly 870 includes a mount 878, a fluid interface 880, and a sensor 875.

The mount 878 includes two-piece clamp securable about the shaft 369. The fluid interface 880 is an L-shaped bracket with a support 871 connected to the mount 878 by a connector (or recessed fastener, such as a bolt) 879. The sensor may be attached to a flat plate portion of the fluid interface 880. In this example, Wp=6 in (15.24 cm), Lp=1.25 in (3.18 cm), Rc=1.5 in (3.81 cm), and Li=3⁹⁄₃₂ in (8.33 cm). The fluid interface 880 is also depicted as having a thickness Tp=0.125 in (0.32 cm) and a connector width Wc=0.875 in (2.22 cm). The mount 878 is depicted as having an IDm=3 in (7.62 cm), an D2=4.25 in (10.79 cm), mount width Wm=0.875 (2.22 cm) and a support length Ls=1.25 in (3.18 cm).

FIGS. 9.1-9.3 show another version of a sensor assembly 970 in a hinge configuration. FIG. 9.1 shows a perspective view of the sensor assembly 970, and deflection applied thereto by fluid flow. In this version, the sensor assembly 970 includes a mount 978, a fluid interface 980, and a sensor 975. FIG. 9.2 shows a detailed view of the fluid interface 980. FIG. 9.3 shows a modified version of the fluid interface 980.'

The mount 978 includes a ring to receive the shaft 369 therethrough. The fluid interface 980 is an L-shaped bracket including a flat plate 990 and a support 971. The support 971 secures the flat plate 990 to the mount 978. The sensor 975 may be attached to the flat plate 990. The flat plate 990 may have dimensions Wp by Lp. A hinge 988 is provided between the plate 990 and the support 971.

The hinge 988 and plate 990 may be stepped as shown in FIG. 9.2, or a flat hinge 988' and plate 990' as shown in FIG. 9.3. The hinge 988, 988' may be secured to the mount 978 to permit deflection as shown in FIG. 9.1. The sensor 975 may detect the deflection of the flat plate 990, 990'. The sensor 975 may transmit the measured deflection as described with respect to FIG. 5. The controller 140 or other unit with processor and/or analysis capabilities may be used receive and analyze the data.

The measured deflection may be used to determine stress based on the following equation:

$$I_x = \frac{b*h^3}{12} \qquad \text{Eqn. (4)}$$

where wp=b and Lp=h. The following formula may be used to determine bending stress in a beam:

$$\sigma = \frac{M*y}{I_x} = \frac{M*\frac{h}{2}}{\left(\frac{b*h^2}{12}\right)} \qquad \text{Eqn. (5)}$$

where σ is stress, M is the moment about a neutral axis, y is the perpendicular distance to the neutral axis and Ix is the second moment area about the neutral axis. Tension stiffness of a uniform bar is governed by the following equation:

$$\varepsilon = \frac{\sigma}{E} \qquad \text{Eqn. (6)}$$

where ε is stiffness factor, E is the modulus of elasticity.

FIGS. 10.1-10.2 show additional versions of a sensor assembly 1070.1, 1070.2 in an arm configuration. FIG. 10.1 shows a perspective view of the sensor assembly 1070.1 having a spherical fluid interface 1080.1. FIG. 10.2 shows a perspective view of the sensor assembly 1070.2 having a cylindrical fluid interface 1080.2.

In each of these versions, the sensor assembly 1070.1, 1070.2 includes a mount 1078, a fluid interface 1080.1, 1080.2, and a sensor 1075. The mount 1078 is an arm disposed through shaft 369 and movable therewith during rotation as indicated by the arrow. The sensor 1075 is positioned on the mount 1078 to measure strain thereof. The flow around the fluid interface as the mixer rotates, causes strain on the mount 1078 that can be measured and correlated with viscosity under laminar flow conditions.

The fluid interface 1080.1, 1080.2 is positioned on an end of the mount 1078. As demonstrated by FIGS. 10.1, 10.2, the fluid interface 1080.1, 1080.2 may have a variety of shapes. For example, the fluid interface may be a spherical fluid interface 1080.1 or a cylindrical fluid interface 1080.2 as shown in FIGS. 10.1 and 10.2, respectively.

FIGS. 11.1-11.3 show additional versions of a sensor assembly 1170.1-.3 in a concentric configuration. FIG. 11.1 shows a perspective view of the sensor assembly 1170.1. FIG. 11.2 shows a cross-sectional view of a sensor assembly 1170.2. FIG. 11.3 shows a perspective view of a sensor assembly 1170.3. In each configuration, the sensor assembly includes a mount 1178, a fluid interface 1180, and a sensor 1175, with the mount 1178 is connected to the fluid interface 1180.

The mount 1178 is a ring with the shaft 369 disposed therethrough. The fluid interface 1180 is a larger ring positioned concentrically about the mount 1178 a distance D3 therefrom. The fluid interface 1180 is connected to the mount 1178 by a spring 1189.1, 1189.2 or a beam 1189.3. The spring 1189.1-1189.2 may be a variety of springs that support the fluid interface 1180 about the mount 1178, such as a lateral spring 1189.1 extending linearly between the mount 1178 and the fluid interface 1180 as shown in FIG. 11.1, or a coil spring 1189.2 extending spirally between the mount 1178 and the fluid interface 1180 as shown in FIG. 11.2.

The sensor 1175 is positioned on either the mount 1178 or the fluid interface 1180 to measure force on the spring 1189.1, 1189.2. The spring drags along the outer fluid interface 1180 due to spring force. The fluid interface 1180 spins with flow of the fluid and rotation of the shaft, and is resisted by viscosity of fluid tension on the spring. As the mixer rotates, strain on the spring 1189.1, 1189.2 may be measured and correlated with viscosity under laminar flow conditions.

In the version of FIG. 11.3, the beam (or plate) 1189.3 is fixed between the mount 1178 and fluid interface 1180. As the shaft and the disc rotate in the fluid, the strain on the disc can be measured as a function of bending on the small plate that holds the disc to the shaft.

FIGS. 12.1-12.3 show additional versions of a sensor assembly 1270.1-1270.3 in a fixed configuration. FIG. 12.1 shows a perspective view of the sensor assembly 1270.1 having a concentric configuration. FIG. 11.2 shows a perspective view of a sensor assembly 1270.2 in a side bracket configuration. FIG. 11.3 shows a perspective view of a sensor assembly 1270.3 in a disc configuration.

In each configuration, the sensor assembly 1270.1-1270.3 includes a mount 1278 and a sensor 1275. The mount 1278 is a ring with the shaft 369 disposed therethrough and rotates therewith. The sensor 1275 is positioned on the shaft 369 to measure strain thereof. In each of the case, torque T may be measured based on the following equation:

$$T \propto \mu * \frac{\delta u}{\delta R} \qquad \text{Eqn. (7)}$$

where μ is fluid viscosity, R is radius of the mount 1278, and u is velocity of the mount 1278.

As shown in FIG. 12.1, a fluid interface 1280.1 is a ring shaped member concentrically positioned about the mount 1278. The fluid interface 1280.1 has an anchor 1290 extended therefrom that is anchored to a wall of the tank 136. The anchor 1290 may be, for example, a fit-for-purpose fabricated metal bracket. The fluid interface 1280.1 is fixed about the rotating shaft 369 and mount 1278 a distance D4 therefrom. As the shaft 369 spins, the fluid interface 1280.1 is fixed to an inside of the tank 136 and torque is measured on the mount 1278.

The concentric configuration of FIG. 12.1 may be use the principle of Couette flow between two coaxial cylinders. The principle may also apply to the concentric configurations of FIGS. 11.1 and 11.2. In these embodiments, the inner cylinder is the shaft 369 and mount 1178, 1278, and the outer cylinder is the fluid interface 1180, 1280.1, 1280.2 placed thereabout. The mount 1178, 1278 spins at a predetermined speed (u), and the strain on the fluid interface 1180, 1280.1 is measured and can be correlated with viscosity. The fluid interface 1280.1 can be fixed to the wall of the tank 136 (e.g., along the ceiling and/or bottom).

As shown in FIG. 12.2, the fluid interface 1280.2 may be a C-shaped bracket, such as a fit-for-purpose fabricated metal bracket, mounted to a wall of the tank 136. The mount 1278 is positioned between upper and lower portions of the fluid interface 1280.2 and rotates therebetween. The mount 1278 is a distance D5 from the fluid interface 1280.2. As the shaft 369 spins, the fluid interface 1280.2 is fixed to an inside of the tank 136 and torque is measured on the mount 1278.

As shown in FIG. 12.3, a bottom of the tank 136 acts as the fluid interface and no separate fluid interface is provided. The mount 1278 is positioned a distance D6 from the bottom of the tank 136. In this configuration, the strain is measured by the sensor 1275 against the bottom of the tank. The bottom of the tank 136 may be used as a stator if the mount 1278 is installed at the bottom of the shaft 369. The fluid may be characterized at a fixed shear rate by installing the stator onto the wall of the tank 136 as shown, for example, in FIG. 12.3. Since distance D6 between the fluid interface 1280.2 and the mount 1278 is fixed, the shear rate can be determined based on revolutions per minute (RPMs) of the shaft 369 and can be used to characterize the fluid.

FIGS. 13.1-13.2 show another version of a sensor assembly 1370 in a pump configuration. FIG. 13.1 shows a perspective view of the sensor assembly 1370 having a concentric configuration. FIG. 13.2 shows a cross-sectional view of a sensor assembly 1370 taken along line 13-13. In each configuration, the sensor assembly 1370 includes a mount 1378, a fluid interface 1380, and a sensor 1375.

The mount 1378 is a ring (or disc) with the shaft 369 disposed therethrough and rotates therewith. The fluid interface 1380 is another ring (or disc) with the shaft 369 disposed therethrough. The fluid interface 1380 is positioned along the shaft 369 a distance D7 from the mount 1378 parallel thereto. In the example shown in FIGS. 13.1 and 13.2, the fluid interface 1380 is the same as the mount 1378, except that the fluid interface 1380 has holes 1391 therethrough.

The sensor assembly 1370 may define a Tesla pump for measuring viscosity. Fluid passes through the holes 1391 and exits between the mount 1378 and the fluid interface 1390 as indicated by the arrows of FIG. 13.2. The fluid thickness impacts resistance on the shaft 369. The sensor 1375 is positioned on the shaft 369 to measure strain thereof as resistance is applied to the shaft 369.

While FIGS. 13.1 and 13.2 show a mount 1378 and fluid interface 1380 of the same size and shape, the fluid interface 1380 may optionally have a different size and shape with or without holes 1391. The shaft 369 may be provided with one or more discs (e.g., mount 1378 and/or fluid interface 1380) of different diameters to obtain strain measurements at different shear rates. The multiple diameters may be used to characterize the fluid. In cases using non-Newtonian fluid, the flow may be shear-thinning in nature.

Figure 14:
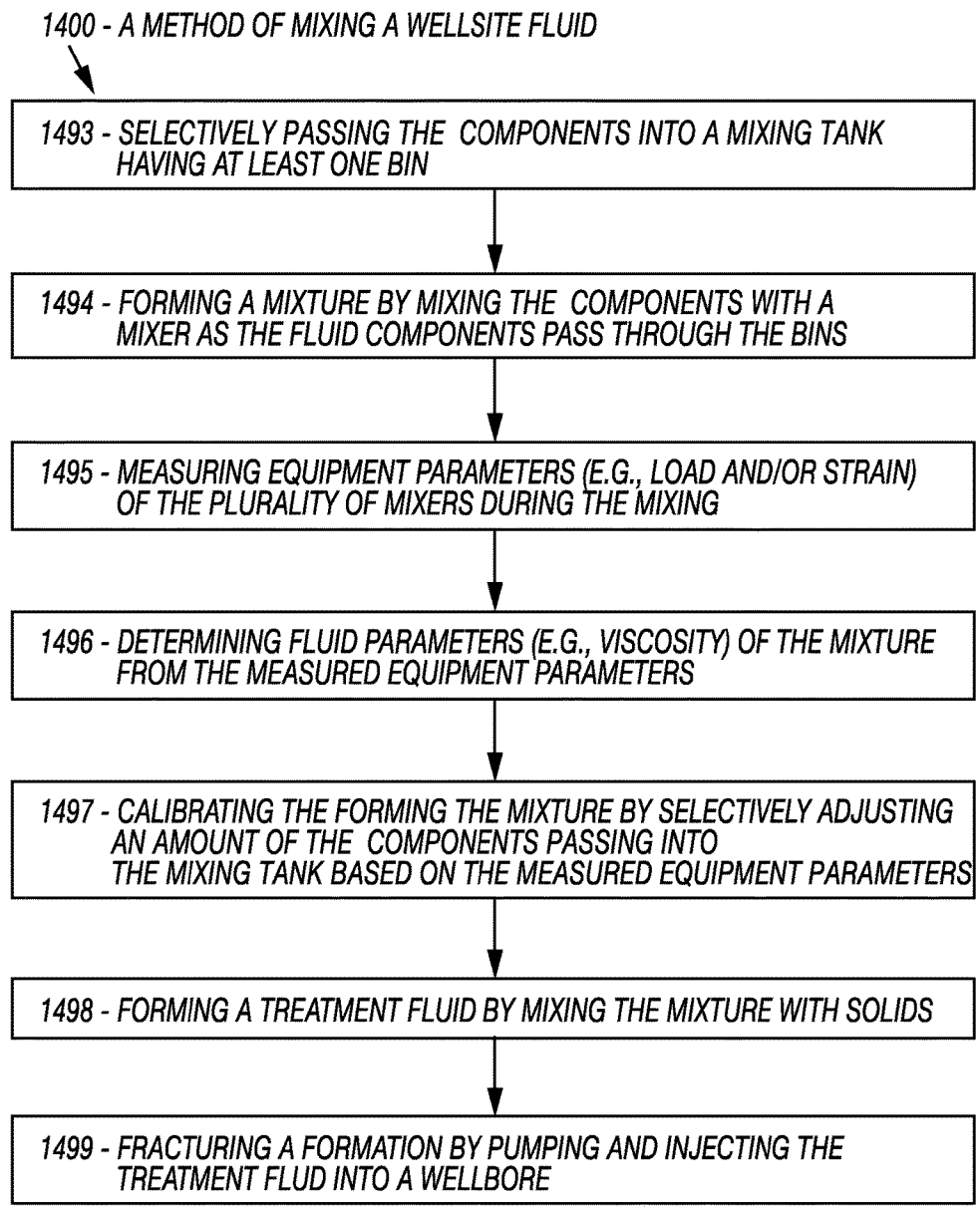
FIG. 14 is a flow chart depicting a method of mixing a wellsite fluid.

FIG. 14 provides a method 1400 of mixing a wellsite fluid, such as a treatment fluid. In this version, the method 1400 involves 1493—selectively passing the components into a mixing tank having at least one mixing bin and 1494—forming a mixture by mixing the components with a mixer as the components pass through the bins. The mixer may include a shaft extending into the tank, a paddle operatively connectable to the shaft, and a mixer sensing assembly operatively connectable to the shaft. The method 1400 continues by 1495—measuring equipment parameters of the mixers during the mixing, and 1496—determining fluid parameters (e.g., viscosity) of the mixture from the measured equipment parameters. The measuring 1495 may involve measuring load on the motors and/or measuring strain on the mixer by detecting movement of the mixer sensing assembly.

The method also involves 1497—calibrating the forming the mixture by selectively adjusting an amount of the components passing into the mixing tank based on the measured equipment parameters, and 1498—forming a treatment fluid by mixing the mixture with solids, and 1499—fracturing a formation by pumping and injecting the treatment fluid into a wellbore.

Part or all of the method may be performed in any order and repeated as desired.

Although the present disclosure has been described with reference to exemplary embodiments and implementations thereof, the present disclosure is not to be limited by or to such exemplary embodiments and/or implementations. Rather, the systems and methods of the present disclosure are susceptible to various modifications, variations and/or enhancements without departing from the spirit or scope of the present disclosure. Accordingly, the present disclosure expressly encompasses all such modifications, variations and enhancements within its scope.

It should be noted that in the development of any such actual embodiment, or numerous implementation, specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the embodiments used/disclosed herein can also include some components other than those cited.

In the description, each numerical value should be read once as modified by the term "about" (unless already expressly so modified), and then read again as not so modified unless otherwise indicated in context. Also, in the description, it should be understood that any range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific ones, it is to be understood that inventors appreciate and understand that any and all data points within the range are to be considered to have been specified, and that inventors possessed knowledge of the entire range and all points within the range.

The statements made herein merely provide information related to the present disclosure and may not constitute prior art, and may describe some embodiments illustrating the invention. All references cited herein are incorporated by reference into the current application in their entirety.

Although only a few example embodiments have been described in detail above, those skilled in the art will readily appreciate that many modifications are possible in the example embodiments without materially departing from the system and method for performing wellbore stimulation operations. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method of mixing a wellsite fluid, the method comprising:
    selectively passing components of the wellsite fluid into a tank at a wellsite;
    disposing a mixer in the mixing tank, the mixer comprising a shaft, a paddle, and a mixer sensing assembly, the mixer sensing assembly having a fluid interface and a mixing sensor;
    forming a mixture by moving the components about the tank with the mixer such that the fluid interface of the mixer sensing assembly is in the path of the fluid and the mixer is movable thereby;
    determining fluid parameters of the wellsite fluid by measuring a strain on the mixer with the mixer sensor; and
    adjusting an amount of at least one of the components based on the measured strain.

2. The method of claim 1, wherein adjusting comprises adjusting the passing of an amount of each of the components based on the measuring.

3. The method of claim 1, wherein the measuring comprises detecting deflection of the mixer with the mixing sensor.

4. The method of claim 1, wherein the fluid interface comprises a disc with holes therethrough and a mount positionable parallel thereto, and wherein the measuring comprises passing the fluid through the holes.

5. The method of claim 1, further comprising communicating the measured strain to a receiver.

6. The method of claim 1, further comprising pumping and injecting the mixture at the wellbore.

* * * * *